US010269052B2

(12) United States Patent
Shinkle, II et al.

(10) Patent No.: US 10,269,052 B2
(45) Date of Patent: Apr. 23, 2019

(54) SYSTEMS AND METHODS FOR CUSTOMIZED ORDER PROCESSING

(71) Applicant: Iconex LLC, Duluth, GA (US)

(72) Inventors: Robert Shinkle, II, Peachtree Corners, GA (US); Darrin Lamont Robinson, Atlanta, GA (US); Austin Daniel Anderson, Dacula, GA (US); Charles Maney, Johns Creek, GA (US)

(73) Assignee: Iconex LLC, Duluth, GA (US)

( * ) Notice: Subject to any disclaimer, the term of this patent is extended or adjusted under 35 U.S.C. 154(b) by 561 days.

(21) Appl. No.: 14/644,882

(22) Filed: Mar. 11, 2015

(65) Prior Publication Data

US 2016/0267567 A1 Sep. 15, 2016

(51) Int. Cl.
*G06Q 30/06* (2012.01)
*G06Q 30/02* (2012.01)

(52) U.S. Cl.
CPC ..... *G06Q 30/0621* (2013.01); *G06Q 30/0269* (2013.01); *G06Q 30/0635* (2013.01); *G06Q 30/0643* (2013.01)

(58) Field of Classification Search
CPC . G06Q 30/0621; G06Q 30/0643; G06Q 50/12
USPC .................................................. 705/15, 26.5
See application file for complete search history.

(56) References Cited

U.S. PATENT DOCUMENTS

| 5,912,743 | A | * | 6/1999 | Kinebuchi | G06Q 10/087 358/442 |
| 2004/0158499 | A1 | * | 8/2004 | Dev | G06Q 30/0601 705/26.1 |
| 2005/0021407 | A1 | * | 1/2005 | Kargman | G06F 3/0482 705/15 |
| 2010/0042463 | A1 | * | 2/2010 | Brockman | G06Q 10/08 705/30 |
| 2010/0076854 | A1 | * | 3/2010 | Martucci | G06Q 20/202 705/15 |
| 2013/0054695 | A1 | * | 2/2013 | Holman | G09B 19/00 709/204 |
| 2013/0130208 | A1 | * | 5/2013 | Riscalla | G06Q 30/0603 434/127 |
| 2013/0215055 | A1 | * | 8/2013 | Okuma | G06Q 30/0643 345/173 |

(Continued)

*Primary Examiner* — Florian M Zeender
*Assistant Examiner* — Christopher R Buchanan
(74) *Attorney, Agent, or Firm* — Schwegman Lundberg & Woessner, P.A.

(57) ABSTRACT

Various embodiments herein each include at least one of systems, methods, software, and data flows for customized order processing. One example embodiment includes receiving data representative of an ordered item and retrieving data representative of components of the ordered item based on the received data representative of the ordered item. This embodiment further includes assembling at least one aggregate dataset of the retrieved data representative of the components, at least one aggregate dataset being a dataset providing a representation of the ordered item when rendered. Each of the at least one aggregate datasets may then be rendered. The rendering may include rendering a label or a wrapper for the ordered item. The rendering may also or alternatively include publishing the rendered data to one or both of a customer loyalty and social media account.

20 Claims, 5 Drawing Sheets

(56) References Cited

U.S. PATENT DOCUMENTS

| | | | |
|---|---|---|---|
| 2013/0317921 A1* | 11/2013 | Havas | G06Q 30/0633 705/15 |
| 2014/0149937 A1* | 5/2014 | Holliday | G06F 3/0482 715/815 |
| 2014/0279092 A1* | 9/2014 | Hurst | G06Q 30/0641 705/15 |
| 2015/0186969 A1* | 7/2015 | Holman | G06Q 30/0621 705/26.5 |
| 2015/0235199 A1* | 8/2015 | Lindenberg | G06Q 20/322 705/7.32 |

* cited by examiner

SYSTEMS AND METHODS FOR CUSTOMIZED ORDER PROCESSING

BACKGROUND INFORMATION

In modern retail environments, such as stores and restaurants, retailers desire to personalize customer experiences. This can result in delivery of products that vary from what is actually ordered, such as with regard to a custom ordered food item. Further, communicating the custom elements of an ordered item to employees tasked with making or assembling the ordered item to ensure a high level of delivery accuracy can be challenging.

Additionally, retailers strive to provide enhanced customer interaction and quality communications to their customers. Such interaction may be desired for one or more purposes, such as enhancing or simplifying the customer experience, providing promotions to customers that match customer preferences, and encourage customer visits to retail outlets.

SUMMARY

Various embodiments herein each include at least one of systems, methods, software, and data flows for customized order processing.

One example embodiment includes receiving data representative of an ordered item and retrieving data representative of components of the ordered item based on the received data representative of the ordered item. This embodiment may further include assembling at least one aggregate dataset of the retrieved data representative of the components, at least one aggregate dataset being a dataset providing a representation of the ordered item when rendered. Each of the at least one aggregate datasets may then be rendered. The rendering may include rendering a label or a wrapper for the ordered item. The rendering may also or alternatively include publishing the rendered data to one or both of a customer loyalty and social media account.

Another method embodiment includes retrieving data representative of components of an ordered item and assembling at least one aggregate dataset of the retrieved data representative of the components, at least one aggregate dataset being a dataset providing a representation of the ordered item when rendered. This method further includes rendering at least one of the at least one aggregate datasets.

A further embodiment is in the form of a system. A system of such embodiments includes a rendering device, at least one data processing device, and at least one memory device. The at least one memory device stores a local database of barcode data and instructions executable by the at least one data processing device. These instructions are executable by the at least one data processing device to perform data processing activities. The data processing activities, in some embodiments, include retrieving data representative of components of an ordered item and assembling at least one aggregate dataset of the retrieved data representative of the components. At least one aggregate dataset is typically a dataset providing a representation of the ordered item when rendered. The data processing activities also include rendering at least one of the at least one aggregate datasets.

DETAILED DESCRIPTION

Various embodiments herein each include at least one of systems, methods, software, and data flows for customized order processing. However, the contributions herein are also much more.

First, some order-customized labeling embodiments provide solutions that enable printing of custom product labels for custom ordered items or services. In some embodiments, a custom printed label may be a single or double sided printing of ordered item or service information that may be affixed to the ordered item or item to be serviced. In other embodiments, the label may actually be a product wrapper or container on which ordered product data is printed. Other data such as promotions, coupons, games, news articles, images, content from a social media platform associated with an account of an ordering customer, and the like may also be printed or otherwise included. Regardless of the item printed, the item printed upon may be considered a substrate that may be comprised of paper and other materials that may be mixed with, coated, or used in place thereof.

In a simple scenario utilizing order-customized labeling, a customer visits a quick service restaurant and orders a customized cheeseburger at a checkout terminal, a self-service terminal, or on a mobile device. Details of the ordered customized cheeseburger may be received through a user interface of the terminal utilized in the particular embodiment. In some embodiments, details of the customized cheeseburger may be received as direct input of the customizations, as a selection of a previously defined item that may be store in or in association with a customer profile, by scanning a barcode or entering a code such as may appear in an advertisement, and the like. Information about the customized cheeseburger is sent to the kitchen and a custom label is printed. The custom label may include one or more of an image of the customized burger as ordered (e.g., showing the triple application of pickles of the customization), a listing of components informing kitchen staff of how to assemble the customized burger, and nutritional information of the customized burger assembled by summing the nutritional values from each component of the customized burger. The label may then be applied to the burger for presentation to the customer. However, in some embodiments, such as when the order came from a kiosk or mobile device app, one or more of a customer name, customer image, custom image, and item image may be added to the label to assist staff in identifying the customer to whom the item is to be delivered or in identifying the item itself.

Subsequently, the customer consumes the customized burger and may think the special item is very good and worth of storing to the customer's account with the restaurant for repeat ordering. The customer may connect with the customer account via the in-store kiosk, online, or via a mobile device app and view the past order. The customized burger may be selected, named (e.g., "Charlie Burger"), and stored for later ordering. The customer may also assign a custom image to the burger, such as an image of a unicorn, a self-image, or whatever. Subsequently, when the item, now named Charlie Burger, is ordered, the label that is printed in the store will include the custom name and image. Additionally, the customer may share the stored item via one or more social media platforms, email, websites, text messages, and the like such that when others follow a link to the Charlie Burger, they may log in to their own customer accounts and add the Charlie Burger to their profile for later ordering. Orders of the customized burger may be tracked and the originating customer's customer account may be credited, in some embodiments, with credits for discounts or free items based thereon. Additionally, these credits may be game credits used to rank customers or items for various purposes. As such, the credits in some embodiments may be monetary in nature as credit for purchase or discount of items, for game play, for determining popularity of an item, and the like.

There are various elements herein that operate in concert in some embodiments, but may equally be deployed in a standalone manner. For example, the customer account embodiments, the custom label printing embodiments, the social media embodiments, etc. may each be deployed individually or in any combination. Thus, no requirement for one should be read into any of the others.

With specific regard to restaurants, Quick Service Restaurants are moving to more complicated menus and menus that allow customization of items. Today, many food items have pre-printed, branded packaging and sometimes a label that itemizes customizations. Pre-printed packaging introduces business complexity because many different packaging items must be managed and kept in inventory. If branding is updated or changed, then the inventory turnover of packaging must be managed.

Some embodiments herein include an on-demand labeling system and process for restaurants and other retail outlets. Such embodiments allow printing of information to identify an ordered item based on the type of the item (e.g., type of food item) as well as any customizations without the need for customized pre-printed packaging for each item. Such embodiments allow for quick identification of an ordered item for matching with one or both of the order and customer, as well as the order customizations. An ancillary benefit also eliminates packaging inventory or pre-printed packaging materials.

Additionally, many times customers regularly visit the same retail outlet, such as to eat at the same quick services restaurant. These customers are loyal shoppers and often will order the same item or items. Ordered items may be stored to a customer profile and leveraged to enable quick ordering by the customer, automatic preparation of the items upon detecting the customer enters the store such as through use of beacon devices, e.g., Bluetooth® or WI-FI® beacon device(s), and a mobile device app, presentment of a loyalty card to a reader device (e.g., barcode, magnetic stripe, Radio Frequency Identification (RFID) tag, etc.), manual entry of customer data at a kiosk or Point-Of-Sale (POS) terminal, and the like.

Instead of auto-ordering, the customer, once identified, may be presented, by a kiosk, mobile device app, or by a POS terminal clerk, with a series of options based on previous purchases. The customer can then accept or modify a previous order or create a new order. The customer may then be associated with an order sent to the kitchen. The transaction record may contain an identification number for the order along with the customer name or picture and order details. From there, the kitchen will prepare the order customized to the customer requirements. When the product is ready to be packaged, the order information is then sent to a printer located in the kitchen. The printer, either via thermal printing, inkjet printing, laser printing, or some combination thereof, will print visually and variably printed identifiable tags on a label/package combination. Such embodiments may allow for the label to be eliminated as the variable information will be printed directly on the package. The printer may also print a black and white or color image of the item ordered—for example burger or chicken sandwich or salad—and any condiments for example lettuce, tomato, onion. Images of the items will closely if not exactly match the images presented to the customer when the item is ordered. If the images themselves cannot be variably printed in a particular embodiment, the selections may instead be checked from a menu listing of pre-printed images where the checking is performed by printing on, near, or otherwise in relation to the preprinted images. Other data utilized and printed on a label or package may include price, inventory ingredients, and calorie information. Data about of the customer order may be stored in a loyalty database to generate future analytic data. The data could be used to market to the customer for future purchases or with offers. Depending on customer preferences or regional legal requirements or business requirements, this information may also be printed. The packaging may also include a bar code that may be scanned at the end of the process to confirm when the order is received by the customer. In some embodiments, affirmative scanning by an employee may be avoided by visual recognition through a camera system of the customer and the item at a point of delivery.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, firmware, or a combination thereof in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
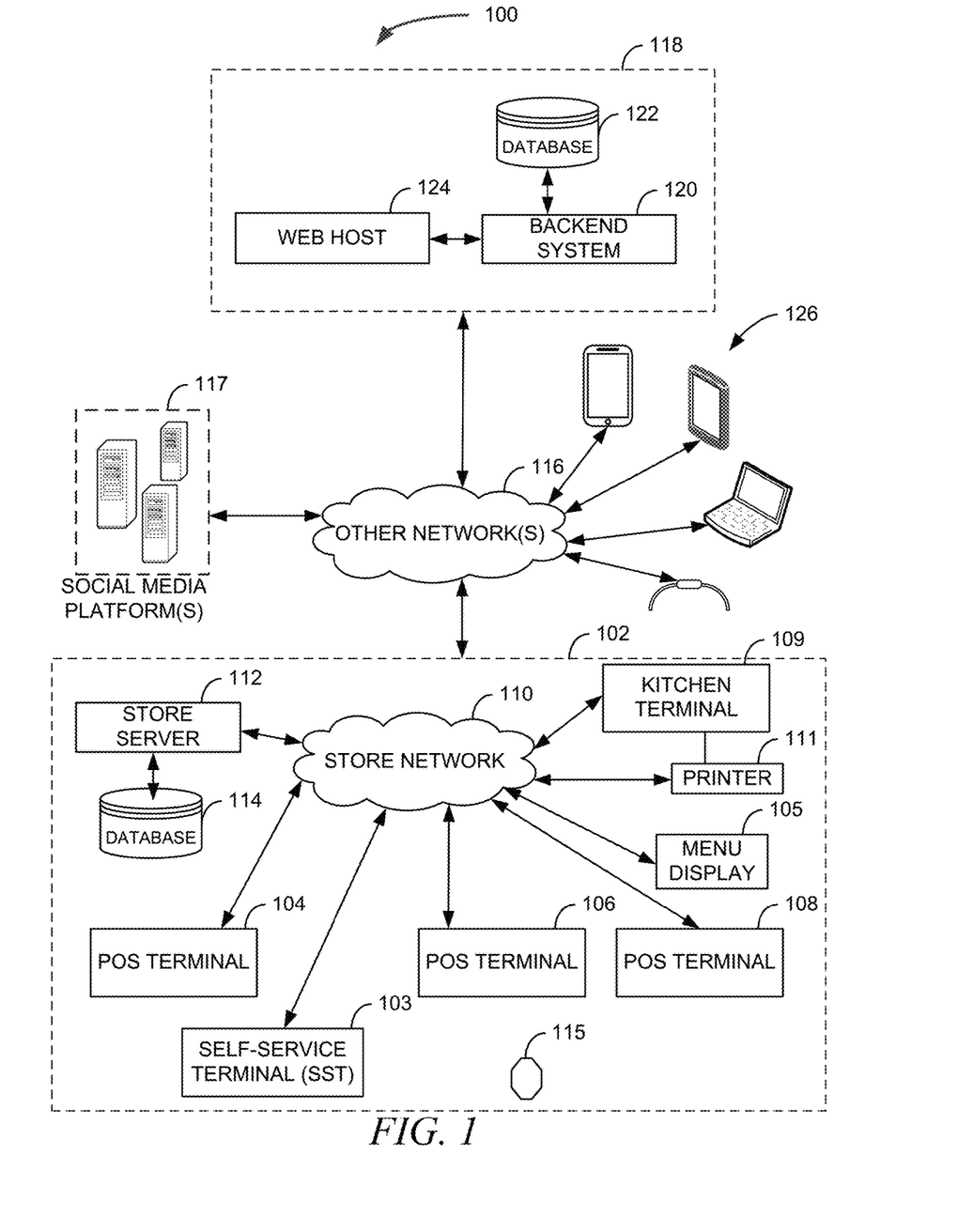
FIG. 1 is a logical block diagram of a system architecture, according to an example embodiment.

FIG. 1 is a logical block diagram of a system 100 architecture, according to an example embodiment. The system 100 is an example of a computing environment within which various embodiments may be implemented. The system 100 architecture is provided as only one example architecture on which some embodiments may be implemented. Other architectures may be utilized in other embodiments.

The system 100 includes a store 102, such as a restaurant, and a data processing center 118. The store 102 may be a standalone entity or a chain where there are two or more stores 102. The data processing center 118, in some embodiments, may be a corporate or regional data processing center of an entity that operates the store 102. In other embodiments, the data processing center 118 may be operated by an entity providing cloud-based data processing services. Regardless, the data processing center 118 may provide various services in support of the store 102 and customers. These services may of course include payment processing, inventory tracking, sales analytics, and reporting. However, the data processing services provided by the data processing center 118 may include maintenance of customer account data, such as may be established by customers in store 102 through use of a self-service terminal 103 or their own computing device, such as one or more mobile devices 126, by accessing services of the backend system 120 via a web host 124. The one or more mobile devices may include one or more of smartphone, a tablet, a smartwatch, other wearable computing device, or other computing device.

A customer account in some embodiments may include general profile data of a customer but may also include information about customer preferences, stored custom food item orders, stored meal orders including one or both of menu and custom food items, favorite locations, loyalty points and loyalty status level, and the like. Additionally, in some embodiments, a customer account may include data linking the customer account to one or more social media platforms 117, such as one or more of the FACEBOOK®, TWITTER®, INSTAGRAM®, PATH®, SNAPCHAT®, and other social media platforms. The linking of a customer account to a social media platform, in some embodiments, allows a customer to share information from their profile, such as a favorite sandwich, with their social media platform friends and other connections.

The store 102, as illustrated, includes three POS terminals 104, 106, 108 and a Self-Service Terminal (SST) 103 connected to a store network 110. The SST may be a kiosk device on which customers may perform tasks such as placing food orders, making payments, viewing and editing details with regard to a customer loyalty account for the restaurant, and the like. The store 102 may also include a kitchen terminal 109 that has a printer 111 coupled thereto. In some embodiments, the kitchen terminal 109 and printer 111 are a single integrated device that receives and prints order data. In other embodiments, the kitchen terminal 109 is a computing device, such as a personal computer, that includes a display on which order data may be presented and outputs ordered item data to the printer 111 which then may print one or more of ordered item labels, ordered item preparation information, wrappers for ordered items, and the like.

The store 102 also includes a store server 112 that may include a database 114 thereon or as may otherwise be accessible via the store network 110. Although three POS terminals 104, 106, 108 and only a single SST 103 are illustrated, the store 102 may include fewer or greater numbers of POS terminals and SSTs. The POS terminals 104, 106, 108 may include one or a combination of various terminal types. For example, the POS terminals 104, 106, 108 may include standard cashier operated POS terminals and the SST 103 may be a self-checkout terminal, but other terminals may also be present, such as a mobile device terminal (e.g., a POS app that executes on a mobile telephone, computer, or tablet), and the like. Generally speaking, the POS terminals 104, 106, 108 and the SST 103 are a form of computing device that executes software to interact with one or both of tellers and customers, process purchase transactions, and to locally or remotely store or provide data with regard to processed purchase transactions and other interactions to at least one computing system, such as a store server 112 and a backend system 120.

The store 102 may also include a store server 112 in some embodiments. The store server 112 may receive transaction data from the POS terminals 104, 106, 108 and SST 103, such as order data, payment transactions, updates to customer profiles, and the like. The store server 112 may then store the received data to a database 114 or the POS terminals 104, 106, 108 may instead store such data directly to the database 114 via the store network 110. Regardless of how the data reaches the database 114, order data may be forwarded to one or both of the kitchen terminal 109 and printer 111, stored or replicated to the database 122 of the backend system 120 at the data processing center 118, posted to a social media platform 117 per a customer account preference or by a customer, and the like.

In some embodiments, the store 102 includes a menu display 105 that is a display panel (LCD, plasma, etc.) or screen on which a menu is displayed or projected. The menu display 105 lists items and options available for order. The content presented on the menu display 105 may be controlled by one or more of the store server 112, a POS terminal 104, 106, 108, the SST 103, a computing device coupled to or integrated within the menu display 105, or other computing device. In some embodiments, the menu display 105 may be manipulated to present menu options and items tailored to one or more customers that may be known to be present. Customer presence may be known by customer interaction at a POS terminal 104, 106, 108, the SST 103, input received from a mobile device 126, or other input received from or with regard to the customer.

In some embodiments, the store 102 may include one or more beacon devices 115 deployed in the store 102. Beacon devices 115, such as a Bluetooth beacon device, may broadcast an identifier of the beacon which is registered in one or both of the store server 112 and the backend system 120 in association with the particular store 102 or a location therein. A signal broadcast by a beacon device 115 is an identifier of the particular beacon device 115 and is received by a mobile device 126, in particular by a mobile device 126. The mobile device 126 app may then transmit the beacon device 115 identifier from the mobile device 126 to the backend system 120 or the store server 112. Alternatively, the beacon device 115 may receive an identifier of a mobile device 126, such as a MAC address of a Bluetooth or WI-FI® transceiver of the mobile device, and transmit that identifier along with a beacon device 115 identifier to the backend system 118 or the store server 112. The identifier of the mobile device 126 when registered in with the system 100 will then provide location information with regard to the particular customer. The store server 112 or backend system 120 will then be aware of the presence of the particular customer and in some embodiments, may then interact with respect to that customer including modifying the menu display 105 content presented based on known preferences, favorites, and other customer profile information to give the customer tailored menu options and even a tailored welcome message.

However, not all embodiments will include a store server 112 and database 114 within the store 102. In other embodiments where the store 102 does not include a store server 112 and database 114, the transaction data may instead be provided by the POS terminals 104, 106, 108 and SST 103 to the backend system 120 and database 122 located in the data processing center 118 accessible via one or more of the store network 110 and one or more other networks 116. The one or more other networks 116 may include one or more of a virtual private network, a wide area network, the Internet, a network operated by a wireless service provider, dedicated and leased networks, and the like. Regardless of the network and network types over which the data may be provided to the backend system 120 and database 122, the data may be provided from the POS terminals 104, 106, 108 and SST 103 in either a push or pull types of arrangements.

Figure 2A:
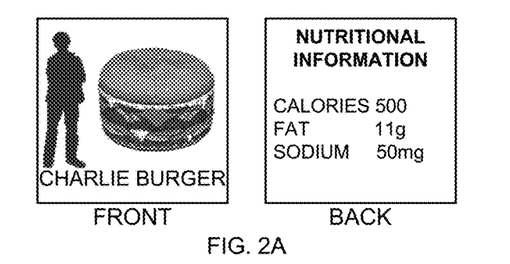
FIG. 2 includes three printed substrate illustrations, according to example embodiments.
Figure 2B:
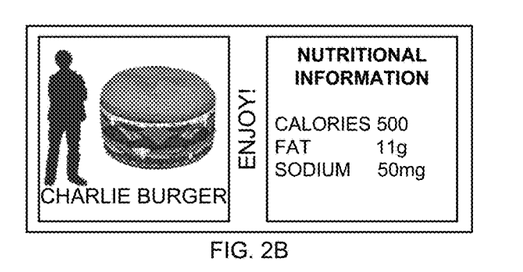
Figure 2C:
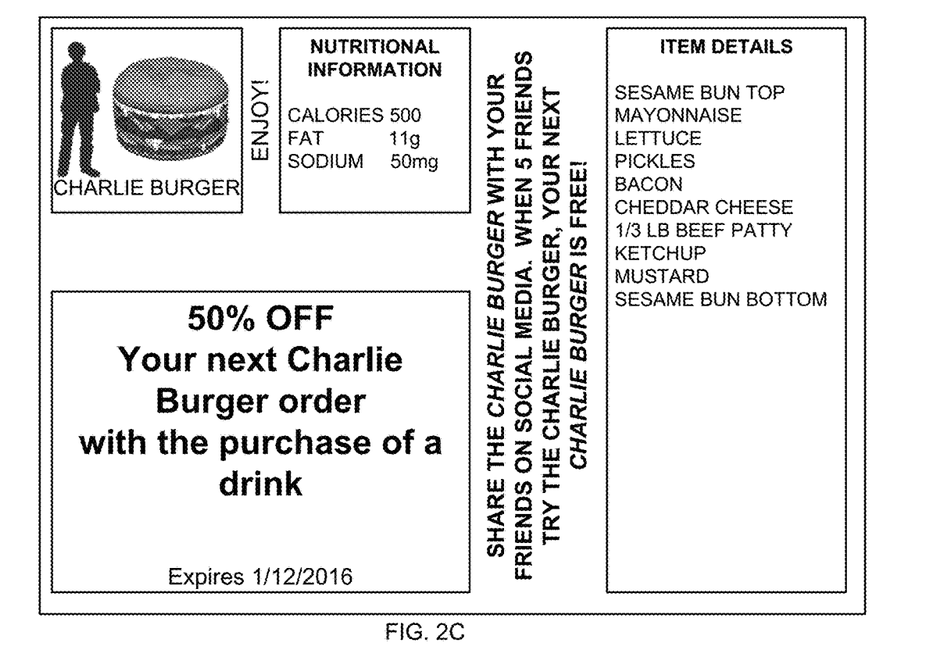

FIG. 2 includes three printed substrate illustrations, according to example embodiments. In particular, the three substrate illustrations are presented as FIG. 2A, FIG. 2B, and FIG. 2C, collectively referred to as FIG. 2.

FIG. 2A is an example of a custom ordered product label that is printed on both sides of a substrate. In some embodiments, the substrate of FIG. 2A may be printed on both sides simultaneously, e.g., as a wide substrate with one or more glue elements on the back for affixing to an item. In other embodiments, the substrate may be folded after printing such that at least a portion of the substrate adheres to itself. In other embodiments, the substrate is printed on opposing sides of the substrate simultaneously. In these various embodiments, the substrate may include preprinted content on one or both sides, which may then be printed upon for various purposes.

The information printed on the substrate of FIG. 2A may include various elements that are associated with the ordering customer, the ordered item, nutritional information of the ordered item, promotional content including of the store visited or the larger entity of which the store is a member or franchise, news headlines or articles, content retrieved from a social media account of the ordering customer, and the like.

The information printed on the substrate, as illustrated, may include an image of or associated with the ordering customer, an image of the ordered item which may be generated automatically based on components included in the customized ordered item, an item name that may be a menu name or a custom name given to the ordered item by the customer, and nutritional information for the ordered item based on a general menu item ordered or as summed from stored nutritional values associated with each component included in a customized ordered item. In other embodiments, the same, different, less, or more information may be printed on the substrate of FIG. 2A. For example, one side of the label may include information printed thereon to identify the item and the other side may be printed to include information for use in the kitchen for preparing the item, such as a bill of materials to be included in the assembly of the item. The substrate may then be affixed to the ordered item by an adhesive on at least a portion of the backside of the substrate, by a sticker or tape, or other adhesive agent or item.

Continuing with FIG. 2, FIG. 2B is another example of a custom ordered product label, but this this example is printed on only a single side of a substrate. The label of FIG. 2B is illustrated as including the same printed information as the printed substrate of FIG. 2A with the exception of an additional message of "ENJOY!" However, that message may be replaced with other information, such as "THANK YOU!", a coupon such as "FREE ICE CREAM CONE", or even "SEE REVERSE SIDE FOR . . . " thereby directing the customer's view to a reverse side of the label that may be preprinted or custom printed at time of printing the ordered item information.

FIG. 2C is yet another example of a custom printed substrate with regard to an ordered item. However, the printed item of FIG. 2C is an item wrapper, such as may be utilized to wrap a sandwich (e.g., cheeseburger, chicken or fish sandwich, etc.). The substrate that will be printed on to form the wrapper may be custom sized according to the product type ordered or properties thereof. For example, a double cheeseburger is thicker than a single cheeseburger and the size of the substrate may be adjusted by a measured-feed printer that prints to a substrate from roll stock. At the same time, the size, location, and amount of printed content to be printed on the substrate may be adjusted automatically in such embodiments to accommodate the size variations. These adjustments may be made through selection a wrapper template from a plurality of wrapper templates.

As can be seen in the illustration of the printed substrate in FIG. 2C, the amount of information printed may include the same information of FIGS. 2A and 2B. This same information may be included in various embodiments, but it need not be. Other information may also or alternatively be printed. For example, an ITEM DETAILS listing may be included that allows not only the customer to view the components included in the ordered item, but also informs kitchen staff of the components to add to the ordered item during cooking or assembly. Similarly, a coupon may be included that may be selected according to the methods described herein based on a store or enterprise configuration or promotion, as tailored to the customer based on the ordered item or other information in the customer's profile, as may be randomly selected, or otherwise. Additionally, a message may be included encouraging the customer to share the custom ordered item on social media by offering a free or discounted item during a subsequent visit. Other information may also be printed on the substrate on either side of the substrate. For example, the customer may specify in customer account preferences what information to print on the wrapper, such as news articles, headlines, content from the customer's social media accounts associated in the customer's profile, stock quotes, and the like. The printed substrate in such embodiments may the provide not only product information, customer identifying information, and promotional information, but also a customer specified informational update, or customer-centric newspaper. Other labels may be designed and printed in various sizes, shapes, arrangements, etc. that are still within the scope of the contributions of the present subject matter and as may be designed to meet the informational requirements of the specific embodiment or customer preference.

Figure 3:
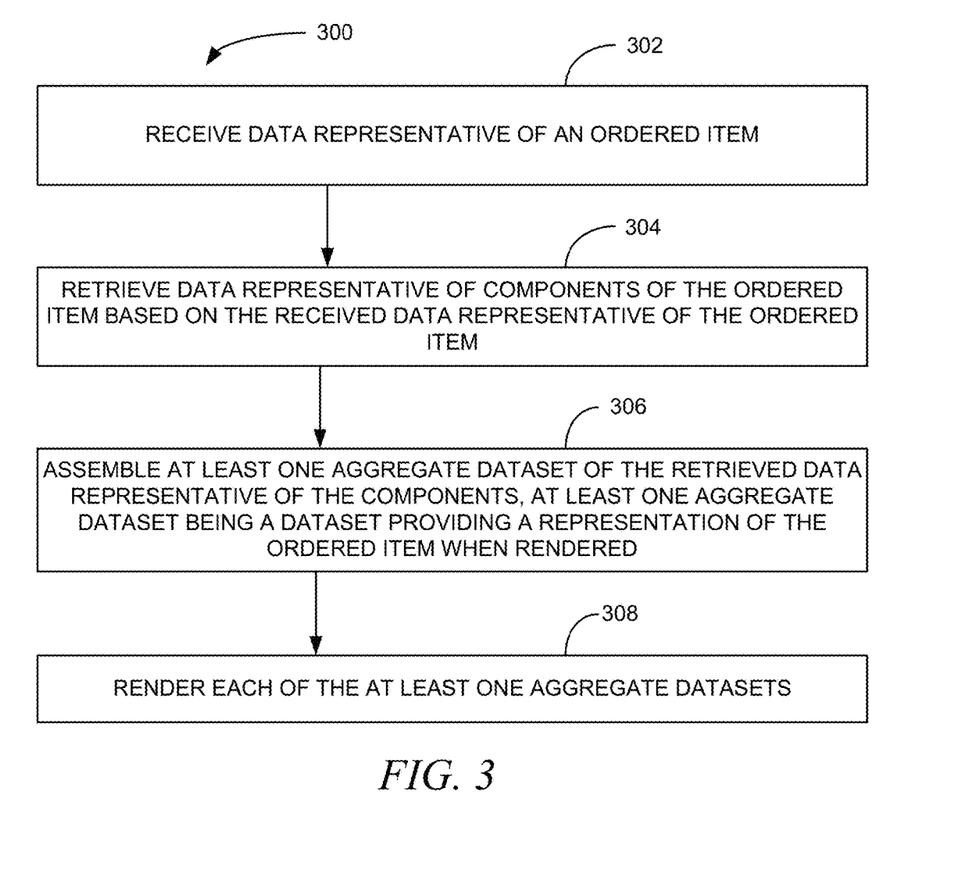
FIG. 3 is a block flow diagram of a method, according to an example embodiment.

FIG. 3 is a block flow diagram of a method 300, according to an example embodiment. The method 300 is an example of a process of processing received data representative of an ordered item, such as a custom food item ordered by a customer. The item may be a standard item with component options being added or removed or even a non-standard item comprised of a la carte components as specified in the order.

The example method 300 includes receiving 302 data representative of an ordered item, such as may be received directly or indirectly from a POS terminal 104, 106, 108, an SST 103, a mobile device 126, a store server 112, a backend system 120, or other computing device, such as those illustrated and described in FIG. 1. The data representative of the ordered item may be received 302 by a kitchen terminal 109, a printer 111, a store server 112, a POS terminal 104, 106, 108, the SST 103, and other such computing device, again as illustrated and described with regard to FIG. 1.

The method 300 further includes retrieving 304 data representative of components of the ordered item based on the received 302 data representative of the ordered item. Next, the method 300 includes assembling 306 at least one aggregate dataset of the retrieved data representative of the components. The at least one aggregate dataset in some embodiments is a dataset providing a representation of the ordered item when rendered. The method 300 then renders 308 each of the at least one aggregate datasets. In some embodiments, the rendering 308 includes providing at least one aggregate dataset to a printing device for printing on a substrate. The rendering 308 may also or alternatively include providing the at least one aggregate dataset to a display device for presentation.

In some embodiments of the method 300 the ordered item is a food item for which there are a plurality of component options when ordered. Each of these components includes at least one stored data item representative of the respective component and each of the at least one stored data items of a respective component has a data type (e.g., image, text, numerical, nutritional value, etc.). In some such embodiments, when the at least one stored data item of a component includes two or more stored data items (e.g., an image of the item and nutritional values of the item), each of the data items are of a distinct data type, each data type representative of different characteristics of the respective component. Further, each respective component may include a stored data item of an image data type, each stored data item of an image data type including an image of the respective component. Each component may also or alternatively include a stored data item of a nutritional-information data type and each stored data item of a nutritional-information data type including nutritional-information value data of the respective component. In such embodiments, the method 300, the retrieving 304 of the data representative of the components includes retrieving at least one of the images of the components of the ordered item and the nutritional-information value data of the components of the ordered item.

In some further embodiments when the components include stored images, the assembling 306 of the at least one aggregate dataset includes assembling the retrieved images of the components of the ordered item to form an aggregate image dataset. Similarly in embodiments where the components include nutritional information, the method 300 includes summing like nutritional-information value data of the retrieved nutritional-information value data to form an aggregate nutritional-information value data. These and other embodiments may also include other data elements that may be assembled, summed, or otherwise aggregated to form an aggregate dataset based on the components of a custom item.

In another embodiment of the method 300, the method receiving 302 of the data representative of the ordered item further includes receiving at least one of customer and order identifying data. The method 300 in such embodiments may also include generating a render dataset including each of the at least one aggregate datasets and data representative of the received at least of one customer and order identifying data. In such embodiments, the rendering 308 of each of the at least one aggregate datasets includes rendering 308 the render dataset. Some such embodiments of the method 300 also include retrieving customer data, via a network from a customer profile database, based on the customer identifying data, the customer data including the data representative of the ordered item. The retrieved customer data may further include at least one of a customer name and an image associated with the customer profile. This data may then be included in the render dataset.

The render dataset may also include additional items. For example, generating the render dataset in some embodiments includes retrieving a promotional dataset, which when rendered, includes promotional information (e.g., a coupon, a discount code, a notice of special pricing or availability, etc.). This promotional information may then be added to the render dataset. This promotional information may be retrieved with specific regard to the customer or information included in the customer's profile. The promotional information may also be retrieved based on a specific store, a location, a date, and other information.

Figure 4:
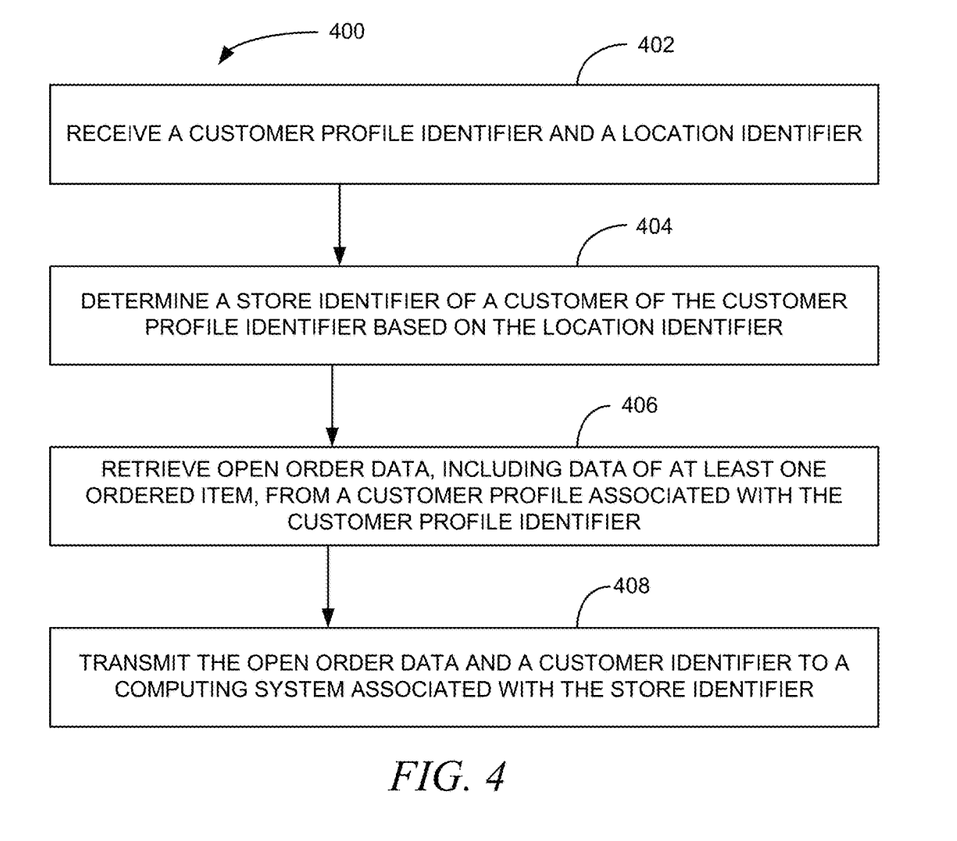
FIG. 4 is a block flow diagram of a method, according to an example embodiment.

FIG. 4 is a block flow diagram of a method 400, according to an example embodiment. The method 400 is an example of a process that may be performed by a backend system 120 or a store server 114 of FIG. 1 in response to input received from or with regard to a customer and a particular store or location. In some embodiments, the method 400 is a precursor to the method 300 of FIG. 3 and feeds order data to the method 300.

The method 400 includes receiving 402 a customer profile identifier and a location identifier. The customer profile identifier may be an account number, a username and password, a MAC address of a wireless communication device of a mobile device, or other data element that may be associated with a customer profile stored in a database. The location identifier may be GPS coordinates, a Bluetooth beacon identifier, an SSID or unique identifier of a wireless router deployed at a known location, data representative of location or store input received from a human user, and the like.

The method 400 may then determine 404 a store identifier of a customer of the customer profile identifier based on the location identifier, unless the store is already otherwise known. Next the method 400 includes retrieving 406 open order data, including data of at least one ordered item, from a customer profile associated with the customer profile identifier. In such embodiments, a customer may pre-stage an order in association with their customer profile such that when they arrive at a store, the order may be automatically sent to the store. Thus, the method 400 also includes transmitting 408 the open order data and a customer identifier to a computing system associated with the store identifier. In some such embodiments, receiving the data representative of the ordered item including data identifying components of the ordered item includes receipt of the data of at least one ordered item in response to the retrieving of the open order data.

Figure 5:
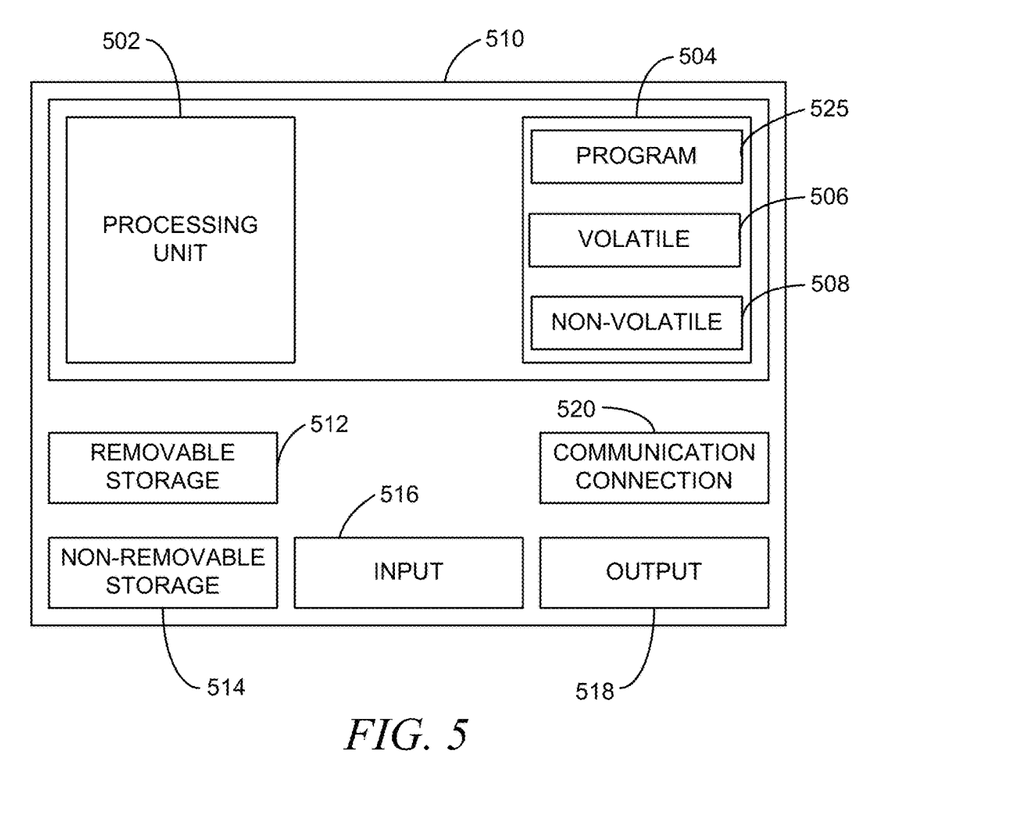
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, other wearable computing device, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving, by executable instructions that execute on a processor from a non-transitory computer-readable storage medium, data representative of an ordered item;
retrieving, by the executable instructions, data representative of components of the ordered item based on the received data representative of the ordered item;
assembling, by the executable instructions, at least one aggregate dataset of the retrieved data representative of the components, at least one aggregate dataset being a dataset providing a representation of the ordered item when rendered;
rendering, by the executable instructions, each of the at least one aggregate dataset;
obtaining, by the executable instructions, a customer-specific image linked by a customer to the ordered item;
posting, by the executable instructions, the ordered item to a social media account of the customer based on a customer preference of the customer and based on data linking between a customer account having the customer preference and the social media account of the customer; and
printing, by a printer on a direction from the executable instructions, a label having the at least one aggregate dataset and the customer-specific image for packaging of the ordered item and a barcode that is scanned confirming delivery of the ordered item to the customer.

2. The method of claim 1, wherein the rendering includes providing at least one aggregate dataset to a printing device for printing on a substrate.

3. The method of claim 1, wherein:
the ordered item is a food item for which there are a plurality of component options;
each component including at least one stored data item representative of the respective component;
each of the at least one stored data items of a respective component having a data type; and
when the at least one stored data item of a component includes two or more stored data items, each of the data items are of a distinct data type, each data type representative of different characteristics of the respective component.

4. The method of claim 3, wherein:
each respective component includes a stored data item of an image data type, each stored data item of an image data type including an image of the respective component;
the retrieving of the data representative of the components including retrieving images of the components of the ordered item; and
the assembling of the at least one aggregate dataset including assembling the retrieved images of the components of the ordered item to form an aggregate image dataset.

5. The method of claim 3, wherein:
each respective component includes a stored data item of a nutritional-information data type, each stored data item of a nutritional-information data type including nutritional-information value data of the respective component;
the retrieving of the data representative of the components including retrieving nutritional-information value data of the components of the ordered item; and
the assembling of the at least one aggregate dataset including summing like nutritional-information value data of the retrieved nutritional-information value data to form an aggregate nutritional-information value data.

6. The method of claim 3, wherein:
each respective component includes:
a stored data item of an image data type, each stored data item of an image data type including an image of the respective component; and
a stored data item of a nutritional-information data type, each stored data item of a nutritional-information data type including nutritional-information value data of the respective component;
the retrieving of the data representative of the components including retrieving:
images of the components of the ordered item; and
nutritional-information value data of the components of the ordered item; and
the assembling of the at least one aggregate dataset including:
assembling the retrieved images of the components of the ordered item to form an aggregate image dataset; and
summing like nutritional-information value data of the retrieved nutritional-information value data to form an aggregate nutritional information value data.

7. The method of claim 1, wherein receiving the data representative of the ordered item further includes receiving at least one of customer and order identifying data, the method further comprising:
generating a render dataset including each of the at least one aggregate datasets and data representative of the received at least of one customer and order identifying data; and
further wherein the rendering of each of the at least one aggregate datasets includes rendering the render dataset.

8. The method of claim 7, further comprising:
retrieving, by the executable instructions, customer data, via a network from a customer profile database, based on the customer identifying data, the customer data including the data representative of the ordered item.

9. The method of claim 8, wherein:
the retrieved customer data further includes at least one of a customer name and an image associated with the customer profile; and
the data representative of the received at least of one customer data included in the generated render dataset is the at least one of the customer name and the image associated with the customer profile.

10. The method of claim 8, wherein generating the render dataset further includes:
retrieving a promotional dataset, which when rendered, includes promotional information; and
adding the promotional dataset to the render dataset.

11. The method of claim 10, wherein the promotional dataset is retrieved at least in part based on the customer identifying data and data stored in the customer profile.

12. The method of claim 8, wherein:
the data representative of the ordered item included in the retrieved customer data includes data identifying an entity that defined the components of the ordered item, the entity being a person or organization; and
adding a representation of the data identifying the entity to the render dataset.

13. The method of claim 1, further comprising:
receiving, by the executable instructions, a customer profile identifier and a location identifier;
determining, by the executable instructions, a store identifier of the customer of the customer profile identifier based on the location identifier;
retrieving, by the executable instructions, open order data, including data of at least one ordered item, from a customer profile associated with the customer profile identifier;
transmitting, by the executable instructions, the open order data and a customer identifier to a computing system associated with the store identifier; and
wherein receiving the data representative of the ordered item including data identifying components of the ordered item includes receipt of the data of at least one ordered item in response to the retrieving of the open order data.

14. The method of claim 13, wherein the location identifier is an identifier of at east one beacon device.

15. A method comprising:
retrieving, by executable instructions that execute on a processor from a non-transitory computer-readable storage medium, data representative of components of an ordered item;
assembling, by the executable instructions, at least one aggregate dataset of the retrieved data representative of the components, at least one aggregate dataset being a dataset providing a representation of the ordered item when rendered;
rendering, by the executable instructions, at least one of the at least one aggregate dataset;
obtaining, by the executable instructions, a customer-specific image linked by a customer to the ordered item;
posting, by the executable instructions, the ordered item to a social media account of the customer based on a customer preference of the customer and based on data linking between a customer account having the customer preference and the social media account of the customer; and
printing, by a printer on a direction from the executable instructions, a label having the at least one aggregate dataset and the customer-specific image for packaging of the ordered item and a barcode that is scanned confirming delivery of the ordered-item when provided to a customer.

16. The method of claim 15, wherein:
the ordered item is a food item for which there are a plurality of component options when ordered, each component including at least one stored data item representative of the respective component, each of the at least one stored data items of a respective component having a data type, and when the at least one stored data item of a component includes two or more stored data items, each of the data items are of a distinct data type, each data type representative of different characteristics of the respective component;
each respective component includes at least one of:
a stored data item of an image data type, each stored data item of an image data type including an image of the respective component; and a stored data item of a nutritional-information data type, each stored data item of a nutritional-information data type including nutritional-information value data of the respective component;

the retrieving of the data representative of the components including retrieving at least one of images and nutritional-information value data of the components; and the assembling of the at least one aggregate dataset including at least one of assembling the retrieved images of the components of the ordered item to form an aggregate image dataset; and summing like nutritional-information value data of the retrieved nutritional-information value data to form an aggregate nutritional information value data.

17. The method of claim 16, wherein receiving the data representative of the ordered item further includes receiving at least one of customer and order identifying data, the method further comprising:

retrieving customer data, via a network from a customer profile database, based on the customer identifying data, the customer data including the data representative of the ordered item and including at least one of a customer name and an image associated with the customer profile; and generating a render dataset including at least one aggregate dataset and data representative of the received at least of one customer and order identifying data; and further wherein the rendering of the at least one aggregate dataset includes rendering the render dataset.

18. A system comprising:
a rendering device;
at least one data processing device;
a label;
at least one memory device storing instructions executable by the at least one data processing device, the instructions executable by the at least one data processing device to perform data processing activities, the data processing activities comprising:

retrieving data representative of components of an ordered item;

assembling at least one aggregate dataset of the retrieved data representative of the components, at least one aggregate dataset being a dataset providing a representation of the ordered item when rendered;

rendering at least one of the at least one aggregate dataset;

obtaining a customer-specific image linked by a customer to the ordered item;

posting the ordered item to a social media account of the customer based on a customer preference of the customer and based on data linking between a customer account having the customer preference and the social media account of the customer; and printing on the label the at least one aggregate dataset and the customer-specific image for packaging of the ordered item and a barcode that is scanned confirming delivery of the ordered-item when provided to a customer.

19. The system of claim 18, further comprising:
a network interface device; and
a printing device;
wherein the rendering includes transmitting the at least one aggregate data set, via the network interface device, to the printing device.

20. The system of claim 18, wherein:
the ordered item is a food item for which there are a plurality of component options when ordered, each component including at least one stored data item representative of the respective component, each of the at least one stored data items of a respective component having a data type, and when the at least one stored data item of a component includes two or more stored data items, each of the data items are of a distinct data type, each data type representative of different characteristics of the respective component;

each respective component includes at least one of:
a stored data item of an image data type, each stored data item of an image data type including an image of the respective component; and a stored data item of a nutritional-information data type, each stored data item of a nutritional-information data type including nutritional information value data of the respective component;

the retrieving of the data representative of the components including retrieving at least one of images and nutritional-information value data of the components; and the assembling of the at least one aggregate dataset including at least one of assembling the retrieved images of the components of the ordered item to form an aggregate image dataset; and summing like nutritional-information value data of the retrieved nutritional-information value data to form an aggregate nutritional information value data.

* * * * *

UNITED STATES PATENT AND TRADEMARK OFFICE
CERTIFICATE OF CORRECTION

PATENT NO. : 10,269,052 B2  
APPLICATION NO. : 14/644882  
DATED : April 23, 2019  
INVENTOR(S) : Shinkle, II et al.

Page 1 of 1

It is certified that error appears in the above-identified patent and that said Letters Patent is hereby corrected as shown below:

In the Claims

In Column 14, Line 25, in Claim 14, delete "east" and insert --least-- therefor

Signed and Sealed this
Twenty-first Day of April, 2020

Andrei Iancu
*Director of the United States Patent and Trademark Office*